United States Patent [19]

Driskill

[11] Patent Number: 5,355,776
[45] Date of Patent: Oct. 18, 1994

[54] DEEP FAT FRYER

[75] Inventor: Galen R. Driskill, Skiatook, Okla.

[73] Assignee: Daylight Corporation, Tulsa, Okla.

[21] Appl. No.: 802,610

[22] Filed: Dec. 5, 1991

[51] Int. Cl.$^5$ ............................................. A47J 27/00
[52] U.S. Cl. ........................................ 99/330; 99/336; 99/408
[58] Field of Search ............... 99/330, 403, 408, 336; 126/391, 15 A, 39 K

[56] References Cited

U.S. PATENT DOCUMENTS

| | | | |
|---|---|---|---|
| 1,264,740 | 4/1918 | Young | 99/408 |
| 2,716,938 | 9/1955 | Smith | 99/408 |
| 2,827,379 | 3/1958 | Phelan | 99/403 |
| 2,899,889 | 8/1959 | Wilson | 99/408 |
| 3,431,834 | 3/1969 | Keathly et al. | 99/330 |
| 3,655,411 | 4/1972 | Albright | 99/408 |
| 3,769,959 | 11/1973 | Parker | 126/91 R |
| 3,869,972 | 3/1975 | Chase | 99/410 |
| 3,975,997 | 8/1976 | Depietro | 99/407 |
| 4,397,299 | 8/1983 | Taylor et al. | 99/403 |
| 4,668,390 | 5/1987 | Hurley et al. | 210/167 |
| 4,684,412 | 8/1987 | Fritzsche | 134/19 |
| 4,838,244 | 6/1991 | Giles, Sr. et al. | 126/391 |
| 4,848,317 | 7/1989 | Prudhomme et al. | 126/391 |
| 4,858,592 | 8/1989 | Hayek et al. | 126/373 |
| 4,898,151 | 2/1990 | Luebke et al. | 126/391 |
| 4,913,041 | 4/1990 | Taber et al. | 99/403 |
| 4,913,042 | 4/1990 | Miller | 99/404 |
| 4,945,826 | 8/1990 | Ripatonda | 99/357 |
| 4,948,950 | 8/1990 | Rae | 219/497 |
| 4,963,378 | 10/1990 | Bhardwaj | 426/302 |
| 5,033,368 | 7/1991 | Brewer | 99/403 |

FOREIGN PATENT DOCUMENTS

| | | | |
|---|---|---|---|
| 0738120 | 7/1943 | Fed. Rep. of Germany | 99/403 |
| 0902305 | 12/1953 | Fed. Rep. of Germany | 99/408 |
| 1903748 | 1/1968 | Fed. Rep. of Germany | 99/408 |
| 1153846 | 3/1958 | France | 99/408 |
| 0586493 | 12/1958 | Italy | 99/408 |
| 0668613 | 3/1952 | United Kingdom | 99/408 |

Primary Examiner—David A. Scherbel
Assistant Examiner—James F. Hook
Attorney, Agent, or Firm—Head and Johnson

[57] ABSTRACT

An improved deep fat fryer having an open top vessel with a bottom formed of intersecting inwardly and downwardly inclined walls forming a V-shaped trough bottom for the vessel, first and second elongated heaters affixed to the vessel flat wall portions and spaced above the lower edge of the trough shaped vessel bottom and arranged so that cooking oil placed within the vessel is heated in the upper portion of the cooking oil but the cooking oil in the V-shaped bottom is unheated to thereby cause convection currents to flow in a manner to carry food particles into the lower V-shaped trough portion of the vessel where the cooking oil is below cooking temperature so that food placed in the vessel and remaining in the upper top portion of the cooking oil is cooked but food particles are carried into the lower portion and are not cooked, the vessel having provisions for draining away the oil having the uncooked portions therein.

4 Claims, 2 Drawing Sheets

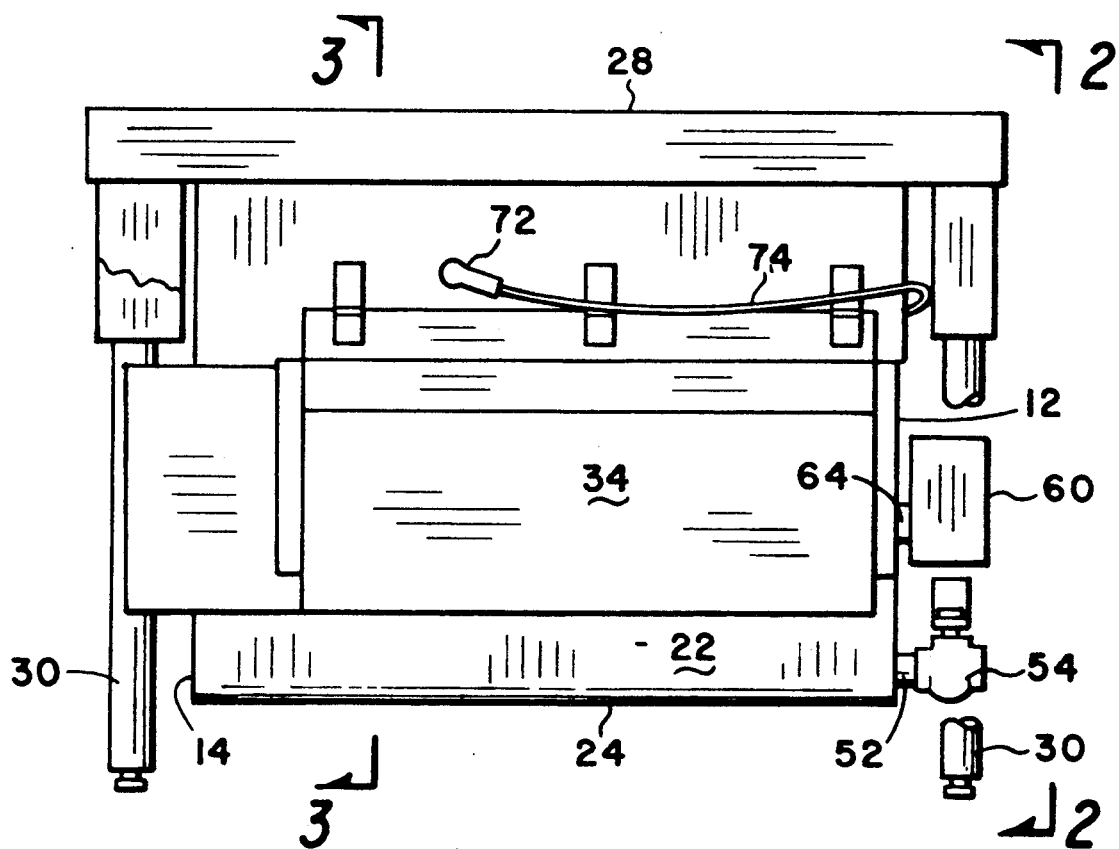
Fig. 1
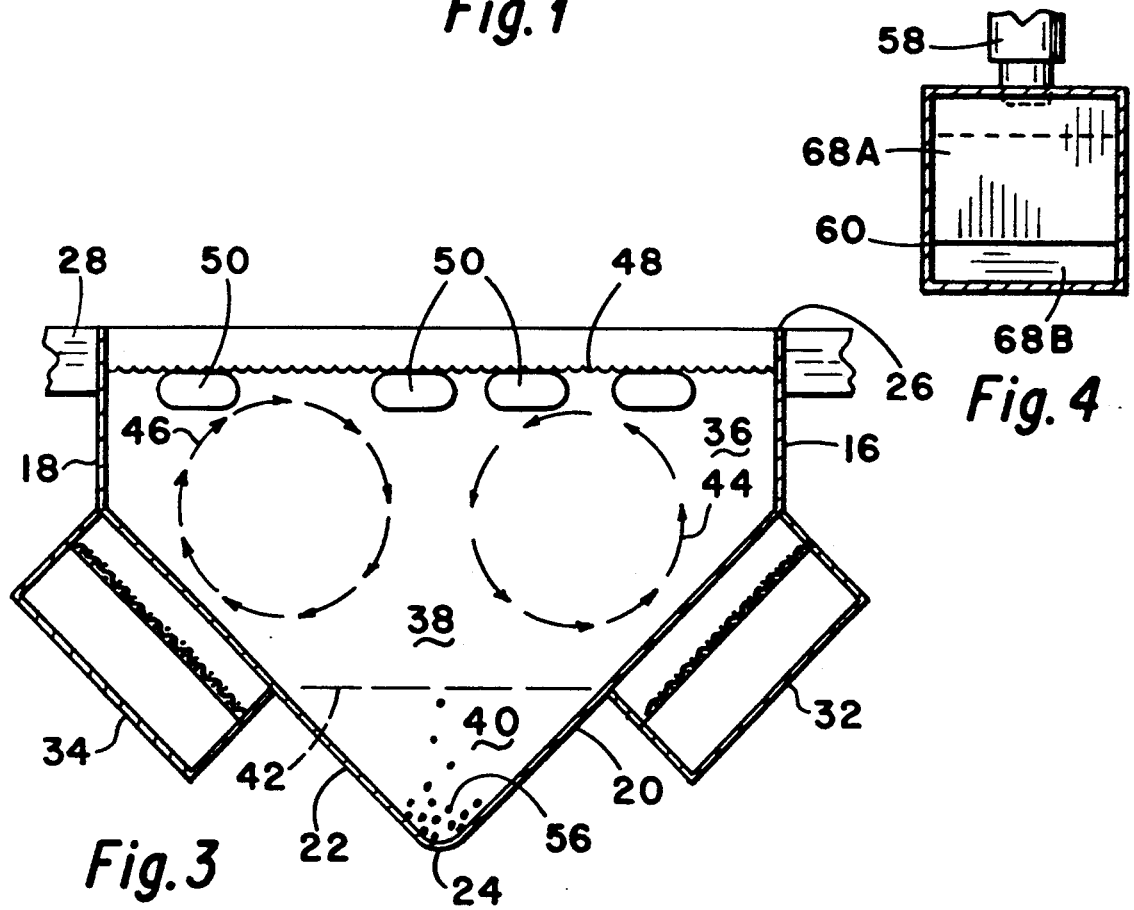
Fig. 3
Fig. 4

DEEP FAT FRYER

BACKGROUND OF THE INVENTION

A common means of cooking food is by deep fat frying, that is, wherein cooking oil is placed in a vessel so that the depth of the cooking oil exceeds the normal height of the item to be cooked. The cooking oil is brought to cooking temperature and food, such as doughnuts or other pastry products, pieces of chicken or other meat products, are placed in the cooking oil and, more specifically, onto the surface of the cooking oil. The food to be cooked may float on the top of the cooking oil where the temperature is sufficient to cook the food products. After the food products are cooked they are dipped from the surface of the cooking oil and removed.

Deep fat frying is particularly useful in preparation of pastry products, such as doughnuts, fried pies, fritters, and so forth. One problem with deep fat frying is that inevitably particles of food break off and separate from the food article. These particles, being small and therefore having a large surface area per unit volume, absorbs heat from the cooking oil very rapidly. After remaining in the cooking oil for a time the particles become so thoroughly cooked as to be charred and turn a black color. If the charred food particles adhere to the food product being cooked, it causes a discolorization to the food products and while not deleterious from a sanitary standpoint, are harmful to the appearance of the finished deep fat fried product. For this reason, it is highly desirable that food particles be prevented from remaining in the cooking oil for a sufficient time so that they become charred and, further, that the food particles be separated from the food products so as not to adhere to the food product.

The present disclosure provides an improved deep fat fryer having, within the vessel of cooking oil, a cooking zone and a cool zone, that is, within the vessel the temperature of the oil in the upper or frying portion is at a high temperature that is particularly desirable for deep fat frying. This temperature can vary between different products, but it is always at a high temperature that will cause the specific product to be properly cooked by deep fat frying. The vessel also contains within the reservoir of oil a cool zone where the temperature of the oil is cooler than that required for deep fat frying.

In addition, the disclosure of the deep fat fryer herein provides a method of creating convection currents within the cooking oil that tends to move food particles that are separated from the food product being cooked in a circuitous path to cause the food particles to move downwardly into the oil cool zone.

The temperature of oil in the cool zone is such that it will not cause food particles to become charred and discolored, as does the cooking oil at the prescribed temperature in the cooking zone.

The deep fat fryer of this disclosure provides a manner of moving food particles by convection current from an upper, high oil temperature cooking zone to a lower, cool zone where the food particles collect for removal from the cooking oil.

The deep fat fryer of this disclosure thereby solves the problem that exists in deep fat fryers in use today.

Others have provided various arrangements for improved deep fat fryers and for background information to the state of the art relative to deep fat fryers, reference may be had to the following previously issued U.S. Pat. Nos. 3,769,959; 3,975,997; 4,668,390; 4,684,412; 4,838,244; 4,848,317; 4,858,592; 4,898,151; 4,913,041; 4,913,042; 4,945,826; 4,948,950 and 4,963,378.

The present disclosure includes a unique arrangement for creating a hot and cool zone within cooking oil within a deep fat fryer and for creating convection currents and a method for handling food particles in a way that is not disclosed in any of these references.

SUMMARY OF THE INVENTION

The present disclosure is for an improved deep fat fryer of the type typically utilized in commercial food preparation facilities, such as doughnut shops, bakeries, fried chicken outlets, restaurants, hotels, food caterers and so forth. While the deep fat fryer of this disclosure may be heated either electrically or by gas, the concepts of the disclosure are particularly useful in the construction of a gas fired deep fat fryer. Gas has the advantage of more precise temperature control since when the gas flame is ignited, it instantaneously achieves the flame temperature and when turned off, it instantaneously terminates the application of heat to the cooking oil so that more responsive temperature is obtained to maintain the cooking oil within the prescribed preferred range of temperatures for the specific food product being prepared. Further, gas is a less expensive fuel than electricity for heating purposes.

The deep fat fryer of this disclosure is formed of an open top vessel having preferably a rectangular top. The vessel has opposed end walls and first and second opposed sidewalls. Each of the sidewalls has a lower portion that is planar and is inclined downwardly and inwardly toward the opposite sidewall. The sidewall lower portions each has a bottom edge and the bottom edges met in a V-shaped trough arrangement. Thus, the lower portion of the sidewalls form a trough shaped bottom for the vessel.

The sidewalls preferably also include an upper portion that is vertically planar. The vessel bottom can be formed of sheet metal, such as stainless steel, and formed of a single piece to provide the opposed lower inwardly inclined planar bottom portions.

A first elongated gas fired heater is affixed to the upper portion of the first sidewall lower portion exterior of the vessel. The first heater is positioned so that a space is provided below the heater and the first sidewall lower portion bottom edge.

In like manner, a second elongated gas fired heater is affixed to the upper portion of the second sidewall lower portion exterior of the vessel. This arrangement provides a space below the second heater and the second sidewall lower portion bottom edge. The elongated heaters are thereby spaced apart and parallel to each other.

Heat provided by the heaters is transferred through the vessel bottom wall to cooking oil contained within the vessel. By the prescribed positioning of the heaters the heat is concentrated in the oil at the upper portion of the sidewalls with substantially no heat being transferred to the cooking oil through the lower portion of the sidewalls. In this manner the oil within the vessel is cooler in the lower trough portion, thereby providing an upper frying zone and a lower cool zone in the cooking oil within the vessel.

This arrangement of providing a V-shaped, or trough shaped, bottom for the vessel along with spaced apart heaters that do not heat the lower most trough portion of the vessel bottom causes convection currents to be formed in the cooking oil in the fryer. These convection currents flow generally in circular paths within the cooking oil. The convection currents tend to move small particles of food that are dislodged or disassociated from the food being prepared into the lower cooking oil cool zone. The temperature of the oil in the cool zone is such that further cooking of the particles is substantially terminated so that the particles are less likely to become charred and blackened. Further, the movement of the food particles into the lower oil cool zone prevents a substantial portion of the particles from adhering to food being prepared.

This disclosure also provides an improved means of moving an air and gas mixture to the opposed first and second elongated gas fired heaters.

A better understanding of the invention will be had by reference to the following description of the preferred embodiment and the claims, taken in conjunction with the attached drawings.

DESCRIPTION OF THE DRAWINGS

FIG. 1 is an elevational exterior side view of a gas fired deep fat fryer that incorporates the principles of this disclosure.

FIGS. 1 and 2 show legs that support the deep fat fryer broken away, the legs serving to hold the deep fat fryer at a level convenient to the workmen.

FIG. 3 is a cross-sectional view taken along the line 3—3 of FIG. 1 showing the interior of the vessel of the deep fat fryer and showing the action of convection currents formed in cooking oil within the vessel to carry food particles into a lower cool zone.

FIG. 4 is a cross-sectional view taken along the line 4—4 of FIG. 2 showing the inclusion of internal baffles within the air-fuel distribution channel to ensure thorough mixture of air and gas before delivery to the heaters.

DESCRIPTION OF THE PREFERRED EMBODIMENT

Figure 2:
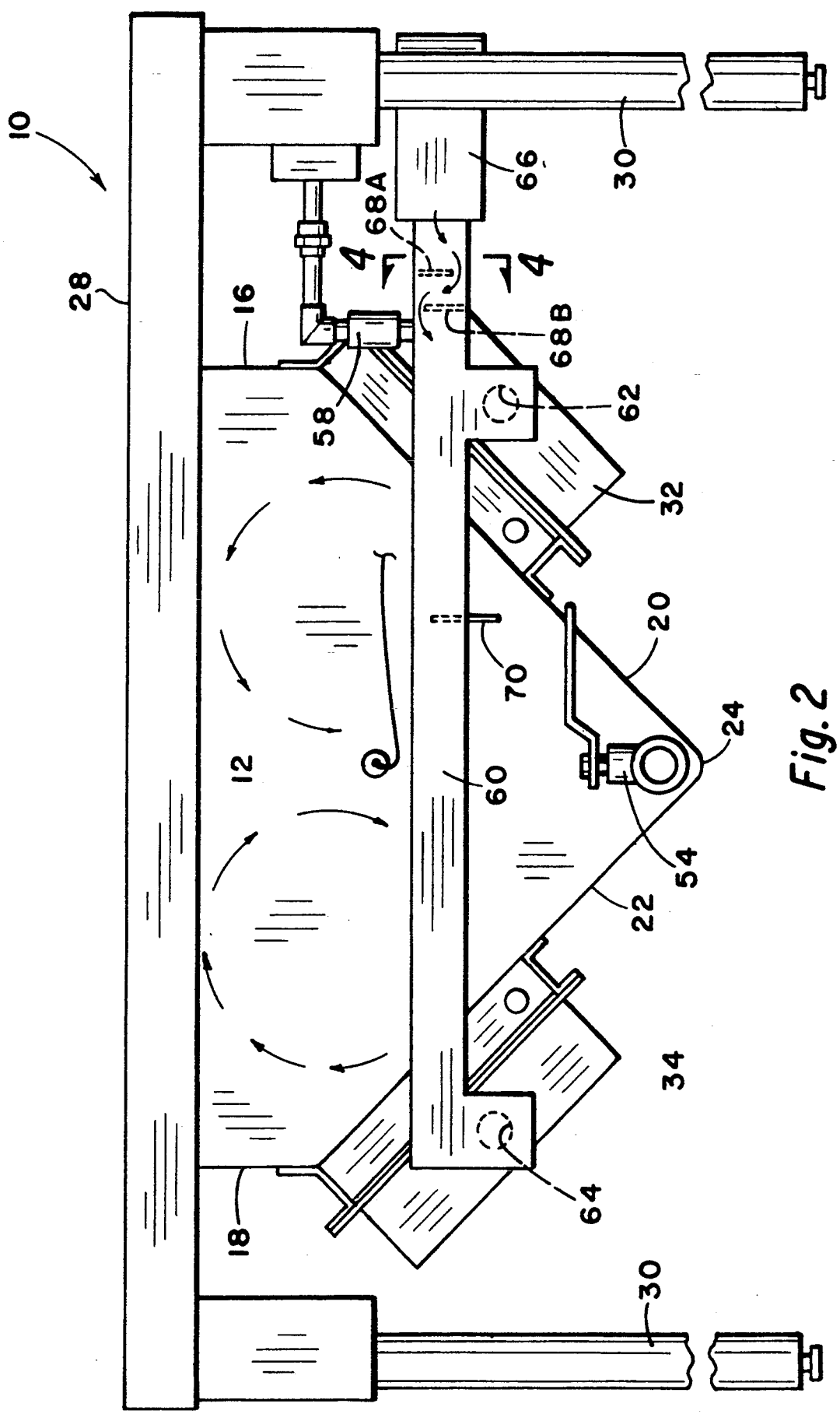
FIG. 2 is an enlarged front or end view as taken along the line 2—2 of FIG. 1. Both

Referring to the drawings, a gas fired deep fryer that incorporates the principles of this disclosure is indicated generally by the numeral 10. The deep fat fryer consists essentially of a vessel having end walls 12 and 14, and opposed sidewalls. Each of the sidewalls includes an upper portion that is preferably vertical, the right sidewall upper vertical portion being indicated by the numeral 16 and the left sidewall upper vertical portion by the numeral 18. The right sidewall has a lower portion 20 that is downwardly and inwardly inclined and meets a similar left sidewall lower portion 22 that is downwardly and inwardly inclined, the lower portions 20 and 22 meeting at lower edge 24 that is preferably rounded, such as a ¾ radius. The vessel bottom, formed of portions 16 through 24, can be formed of one sheet of metal, such as stainless steel, that is then welded to end walls 12 and 14.

The configuration of the vessel sidewalls thereby forms a lower trough shaped portion. The vessel is rectangular and has an open top 26. The vessel, formed of the end walls and sidewalls, is supported in a table arrangement having a table top 28 with an opening conforming to the upper opening of the vessel. The table is supported by downwardly extending legs 30 so that table top 28 and vessel upper open top 26 are at a comfortable working height. Affixed to the right sidewall inclined portion 20 is an elongated heater 32. The heater 32 can be either electric or gas, however, a gas fired heater is much preferred for reasons heretofore stated. Heater 32 is affixed exteriorly of the vessel bottom surface so that no portion of the heater extends within the vessel, leaving the interior of the vessel plain, unobstructed and easily cleaned.

In like manner, a second or left heater is affixed to the vessel left sidewall inclined portion 22. Most important is the fact that the heaters are affixed at the upper portions of the right and left sidewall inclined portions, that is, the heaters are positioned so that a substantial space exists between heaters 32 and 34 and the vessel lower trough edge 24.

The placement of heaters 32 and 34 is critical in relationship to the specific structure of the vessel for reasons that are best illustrated with reference to the cross-sectional view of FIG. 3. The placement of heaters 32 and 34 so that they are spaced above bottom lower edge 24 results in the creation, within cooking oil 36 in the interior of the vessel, of an upper cooking zone 38 and a lower oil cool zone 40. The upper and lower temperature zones within oil 36 are illustrated by the dotted line 42 but, of course, this is for illustration purposes only as there is no structure within the vessel separating the upper, hot cooking zone 38 and lower, cool zone 40.

Heat from heaters 32 and 34 is concentrated on the exterior surface of the vessel bottom portion. This concentration of heat, which is transferred through the vessel bottom portion to oil 36, results in the creation of convection currents, indicated by the dash lines 44 and 46. The convection current above right heater 32 is counterclockwise, as seen in FIG. 3, and the convention current 46 above the left heater 34 is clockwise. The oil in cool zone 40 is more or less isolated from convection currents 44 and 46 created in the cooking oil within the vessel.

Food products are cooked by distributing them on surface 48. Deep fat frying employs a system wherein either the products may be cooked by buoyancy so as to float at surface 48 or the products may be cooked by submerging them in the oil. Food products, such as long johns, are held in the submergible position by screens or the like (not shown) positioned within the vessel upper vertical portion. The deep fat fryer of this disclosure is not intended for use to cook products that have a specific gravity heavier than cooking oil 36, but is intended only for cooking products that, when placed in the oil tend to float at surface 48 unless forced beneath the surface by a screen. FIG. 3 shows four doughnuts 50 that are in the process of being cooked. After doughnuts 50 are cooked they are dipped out of cooking oil 36 and additional doughnuts or similar products are placed in the cooking oil.

As previously discussed, most products that are prepared by deep fat frying are of the type that product loose food particles. For instance, the typical way of cooking fried chicken by deep fat frying is to dip the chicken in a batter, and in placement of the battered covered chicken into oil some of the batter inevitably is dislodged. In similar manner, when doughnuts, or other materials to be cooked, are deposited onto oil surface 38 food particles tend to dislodge and break off. If these food particles are thoroughly cooked, that is, if they remain for an extended period of time within cooking oil 36 they become charred and blackened. While perfectly sanitary and safe for human consumption, nevertheless, when such particles adhere to the finished product they discolor it. If the dislodged particles pass downwardly into cool zone 40 the temperature is such that the particles are not further subjected to the high temperature in cooking zone 38 and therefore are not charred. In addition, with the particles in cool zone 40 they are not in contact with products 50 being cooked and, therefore, do not adhere to the product surfaces.

The construction and arrangement of the deep fat fryer of FIGS. 1, 2 and 3 employs a system wherein a cool zone is provided for particles separated from food products and wherein convection currents are established that intend to carry such particles downwardly and into the cool zone.

As shown in FIGS. 1 and 2, a pipe 52 having a valve 54 is attached to the vessel front end wall 12 adjacent to lower trough edge 24. This permits cooking oil 36 to be drained from the interior of the vessel and in the process of draining, the dislodged food particles 56, as seen in FIG. 3, tend to be drained out of the vessel as oil is removed from it.

The arrangement of externally applied gas fired heaters 32 and 34 leaves the interior of the vessel unobstructed, that is, the end walls and sidewalls have no protrusions therein so that cleaning the vessel after it has been drained of cooking oil 36 is greatly simplified.

As seen in FIG. 2, gas is applied to the heaters through a control valve 58. To distribute the gas to the heaters an air-fuel distribution channel 60 is employed, that may be of generally rectangular cross-sectional configuration. The channel 60 has a connection to an air-fuel inlet 62 of first heater 32 and, in similar manner, to an inlet 64 to the second or left gas fired heater 34.

Air is delivered into channel 60 by means of blower 66. The air is commingled with the gas that enters through valve 58 into channel 60. Internal baffles 68 within the channel serve to increase the turbulence of flow of air from blower 66 to cause it to thoroughly mix with gas entering channel 60 from valve 58 so that intimately mixed air fuel composition is fed by the channel into the inlets 62 and 64.

In order to balance the flow of fuel into heaters 32 and 34, a moveable baffle 70 extends within channel 60. The baffle can be adjusted so as to create equal fuel flow through inlets 62 and 64 and thereby control heaters 32 and 34 so that they generate substantially equal amounts of heat which are transmitted through vessel walls 20 and 22 into oil 36 within the vessel.

FIG. 4 is a cross-sectional view of channel 60, enlarged, showing baffles 68A and 68B as used for creating turbulence of the air flow to augment mixture with gas as it is distributed to the heaters.

Only the portions of the gas fired deep fat fryer 10 that are germane to the essence of this disclosure are illustrated and described. The heaters 32 and 34 typically include electric igniters that are not illustrated. Further, temperature control means are required, such as illustrated by a temperature sensor 72 in FIG. 1. Temperature sensor 72 has a conductor 74 extending to a control panel that controls valve 58 and blower 66 to apply fuel to the heaters 32 and 34 or to cut off fuel flow to the heaters, as required to maintain the temperature of cooking oil 36 within upper cooking zone 38 at the required temperature. The details of such temperature control are not shown since they are standard typically used items with deep fat fryer equipment.

Further, heaters 32 and 34 may be arranged in a variety of ways and can include means for easily attaching or detaching the heaters from the vessel sidewalls or for opening the heaters for repair and inspection as necessary. The details of construction of the heaters are not a part of the basic concept of the gas fired deep fat fryer herein and may vary considerably while remaining within the scope of this disclosure. Further, a deep fat fryer having a table with a top support structure 28, legs 30 and so forth, usually includes back splashes and other features that are not illustrated since they are standard items and not directly related to the unique concepts of the deep fat fryer of this disclosure.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A deep fat fryer comprising:
   an open top vessel having sidewalls and a bottom and having a quantity of liquid cooking oil therein, the vessel bottom being configured to provide, within the vessel, an upper cooking zone and a lower zone;
   first and second spaced apart gas fired heater units supported to said vessel bottom, each heater having an fuel/air mixture inlet, said heater units being arranged to provide heat to said cooking oil in said upper cooking zone through said vessel bottom to raise the temperature of said cooking oil in said upper cooking zone to frying temperature but wherein significantly less heat is transferred to said cooking oil in said lower zone;
   an air blower having an outlet;
   a fuel/air distributor channel having a first end and second end, the first end being connected to said blower outlet, the distribution channel having a gas inlet adjacent said first end and having spaced apart first and second fuel/air outlets spaced from said first end and from said gas inlet in the direction towards said distributor channel second end, said first fuel/air outlet being connected to said first heater unit and said second fuel/air outlet being connected to said second heater unit; and
   a single adjustable baffle within said fuel/air distributor channel between said first and second fuel/air outlets providing a single adjustable means to equalize the fuel/air input to said first and second heater units.

2. A deep fryer according to claim 1 wherein each of said sidewalls has an upper substantially vertical portion with a bottom edge and an inclined portion extending from said vertical portion bottom edge.

3. A deep fat fryer according to claim 1 wherein said vessel has opposed end walls and wherein said bottom is of generally V-shaped arrangement in planes parallel said end walls to thereby provide a vessel bottom that is formed of opposed planar bottom portions inclined inwardly and downwardly toward each other to form a V-shaped trough portion, said lower zone within said vessel being within the lower portion of said V-shaped trough portion.

4. A deep fryer fat according to claim 1 including:
fixed baffles within said fuel/air distribution channel between said gas inlet and said first and second fuel/air outlets to induce turbulence and facilitate mixture of air and gas within said distribution channel.

* * * * *